MAGNETIC AMPLIFIERS

Filed June 14, 1957 3 Sheets-Sheet 1

INVENTORS
HARVEY RUBINSTEIN
LORIN KNIGHT

BY Fred Jacob
ATTORNEY

INVENTORS
HARVEY RUBINSTEIN
LORIN KNIGHT
BY Fred Jacob
ATTORNEY

MAGNETIC AMPLIFIERS

Filed June 14, 1957 3 Sheets-Sheet 3

INVENTORS
HARVEY RUBINSTEIN
LORIN KNIGHT

BY Fred Jacob
ATTORNEY

United States Patent Office 3,048,706
Patented Aug. 7, 1962

3,048,706
MAGNETIC AMPLIFIERS

Harvey Rubinstein, Lynnfield Center, and Lorin Knight, Watertown, Mass., assignors, by mesne assignments, to Laboratory For Electronics, Inc., Boston, Mass, a corporation of Delaware Filed June 14, 1957, Ser. No. 665,828
8 Claims. (Cl. 307—88)

The present invention relates in general to new and improved magnetic core amplifiers wherein each core has a rectangular hysteresis characteristic enabling it to exist in one of two predetermined magnetic states, in particular amplifiers having both direct and logically inverted outputs.

In general, when magnetic amplifiers are employed for processing data in binary digital form, the sense of magnetization of the core in each amplifier stage is determinant of the binary digit or bit stored therein. Thus, a binary Zero may be represented by a negatively magnetized or "set" core, while a binary One will be represented by a "reset" core having the opposite sense of magnetization. Each core of a multi-stage magnetic amplifier is pulsed at the same repetition frequency such that the magnetization thereof may change only during the driving pulse intervals. When the respective cores of the several stages of a multi-stage amplifier are sequentially connected, the application of driving pulses has the effect of passing the sense of magnetization of a given core, i.e. the bit stored therein, down the sequence of cores to the ultimate output.

Magnetic amplifiers yielding a direct, as well as a logically inverted output signal in response to an input signal have been in use for some time. An amplifier of this kind is the subject of Patent No. 2,933,719, issued to Robert C. Kelner and Harvey Rubinstein on April 19, 1960. A binary One applied to the input of such an amplifier will appear as a binary One at the direct output one bit period later, simultaneously with the appearance of a binary Zero at the inverted output. In prior art magnetic amplifiers the additional winding and other circuit elements necessitated by the inverted output have frequently proved troublesome due to the interaction of the core windings by transformer action. Thus, the resonant circuit which consists essentially of the inductance of the direct output winding and its associated stray capacitance as well as the inductance and capacitance reflected from the other core windings, produces oscillations due to voltage changes. The configuration of circuit elements is such that these oscillations do not balance out in their effect upon the core whereby a certain amount of magnetization or "set" is applied to the latter. The subsequent driving pulse has to overcome this "set" before it can operate on the core in the intended manner. Thus, a certain amount of delay is occasioned upon reading the signal into the core which may be sufficiently large to cause the subsequently occurring read-out signal to find the core with a spurious sense of magnetization. Under these conditions, an incorrect signal is read out of the core and is transmitted to subsequent cores in the sequence. Thus, errors may occur which affect the reliability of the equipment.

In the past, attempts at overcoming these difficulties have generally taken the form of selecting diodes having extremely fast switching periods, as well as selecting cores which were carefully wound to specification such that their delay period was held to a minimum. These efforts at improving the reliability of the equipment have proved costly and time consuming. The present invention provides means for coupling the inverted output winding back to a source of driving pulses such that the effect of the oscillations which occur and which previously affected the reliability of the amplifier, are no longer of any consequence. The magnetic amplifier so provided is capable of supplying direct as well as logically inverted output signals without undue restrictions on the kind of components employed and is further capable of operating at the desired frequencies.

Accordingly, it is an object of the present invention to provide new and improved magnetic amplifiers capable of reliable operation at relatively high frequencies while supplying direct as well as logically inverted output signals.

It is another object of this invention to provide simple, economical magnetic amplifiers having both direct and inverted signal outputs and providing reliable operation while using standard components.

It is a further object of this invention to provide magnetic core amplifiers having means for supplying both direct and inverted output signals while preventing the spurious magnetization of the cores by the application of driving pulses to the inverted output means.

These and other novel features of the invention together with further objects and advantages thereof will become apparent from the following detailed specification with reference to the accompanying drawings in which.

Figure 1:
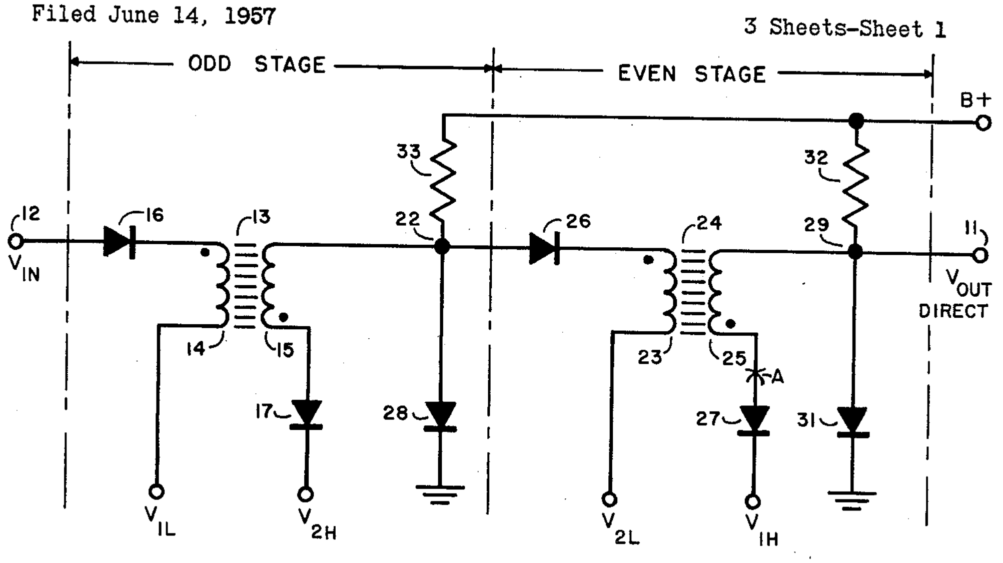
FIG. 1 illustrates a magnetic amplifier for providing a direct output signal only in response to an input signal.
Figure 3:
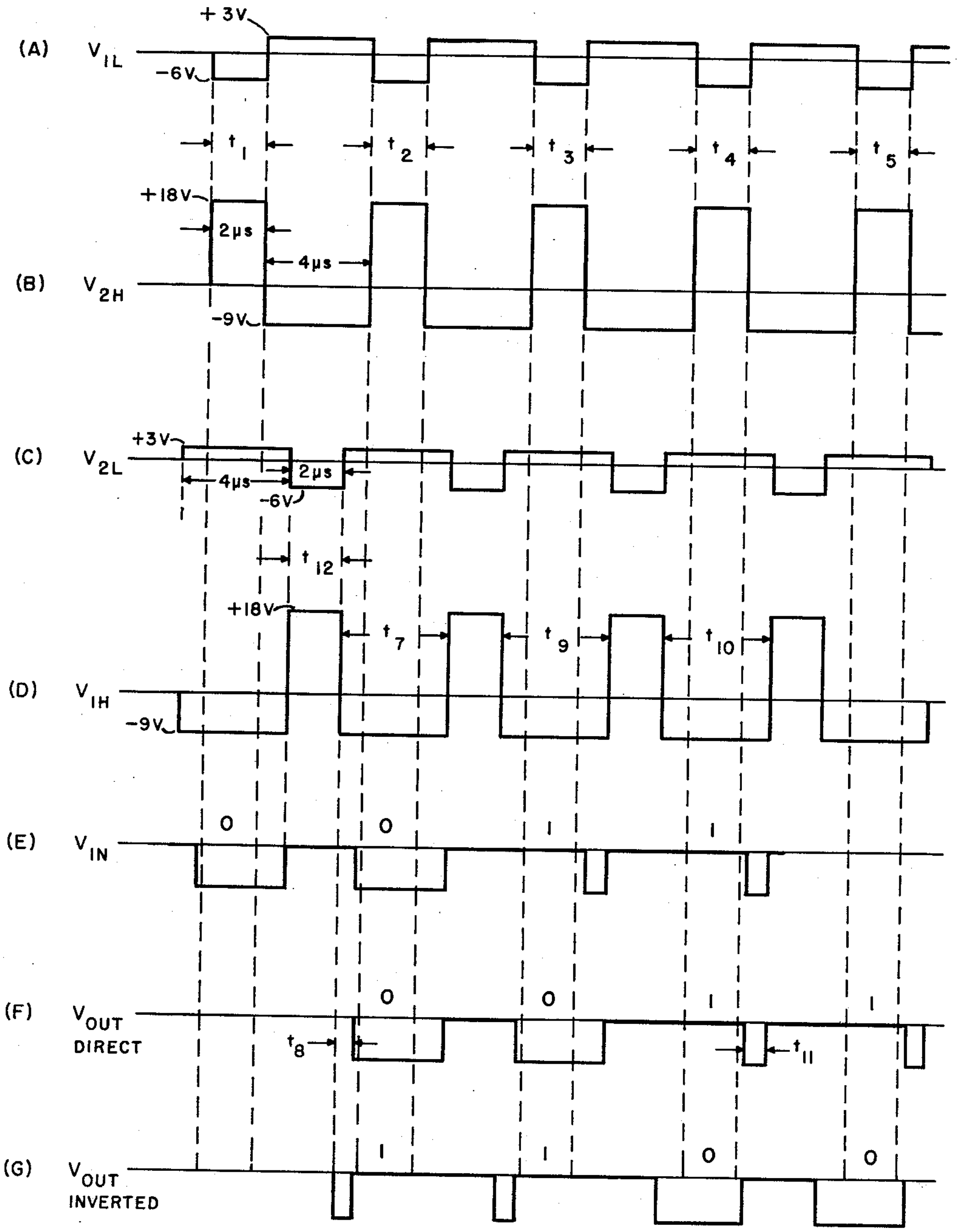
FIGS. 3(A) to 3(H) illustrate some of the waveforms employed herein which are pertinent to forming an understanding of the invention.
Figure 3:
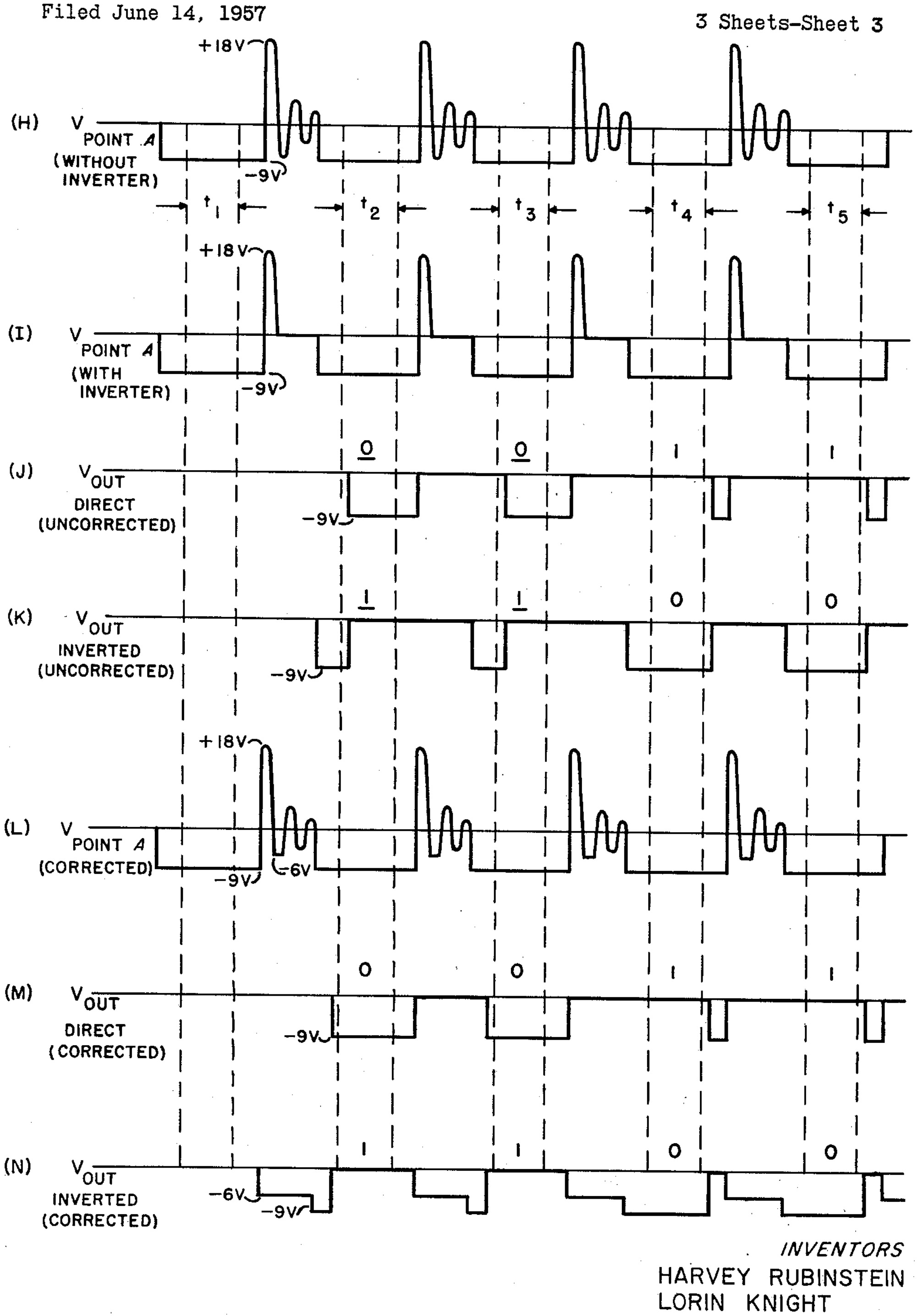

With reference now to the drawings, FIG. 1 shows a voltage-operated magnetic amplifier which provides a direct output signal at output terminal 11 in response to an input signal applied to input terminal 12. The odd stage of the amplifier comprises a core 13 having an input winding 14 and an output winding 15, the dot notation in the drawing indicating the winding terminals which are in phase. An input signal is applied to a first terminal of winding 14 by way of a diode rectifier 16, the latter being poled to conduct when the potential of the winding-connected cathode is less than that of the anode connected to input terminal 12. The second terminal of input winding 14 is connected to a source of alternately positive and negative driving pulses $V_{1L}$ which provides a waveform as shown in FIG. 3(A). Similarly, a pulsed waveform $V_{2H}$, illustrated in FIG. 3(B), is applied to the second terminal of winding 15 by way of diode rectifier 17 the anode of which is connected to the latter winding. In a preferred embodiment, waveform $V_{1L}$ and $V_{2H}$ are supplied by driver circuits of the kind described in a formerly copending application, now abandoned, by Lester W. Allen and Harvey Rubinstein, Serial No. 612,137 filed September 26, 1956; or in Patent No. 2,964,647, issued to Harvey Rubinstein on December 13, 1960. For the sake of simplicity, the dwell period provided by the waveforms illustrated in the above-mentioned copending applications has been omitted in FIG. 3 of the instant application. It will be understood, however, that the apparatus of the present invention may be readily modified such that each pulse packet, i.e. each succession of one positive and one negative pulse, is succeeded by a dwell period in order to provide variable frequency driving pulses. The voltage values indicated in FIGS. 3(A) and 3(B) are illustrative of a preferred embodiment of the invention. Desired changes may be carried out by varying the number of turns of the windings on the core, similarly, the indicated duration of the pulses is subject to variation in accordance with the requirements of the apparatus.

Returning now to FIG. 1, a junction point 22, which is connected to the first terminal of winding 15, is resistor-coupled to a source of positive D.C. voltage labeled B+. Additionally, diode 28 is so connected to prevent the potential of the junction point from rising above ground. Another diode 26 has its anode connected to point 22 while the cathode is connected to a first terminal of winding 23 which is wound on core 24 in the even stage of the amplifier. The latter core has a hysteresis characteristic similar to that of core 13. A pulsed waveform $V_{2L}$ is applied to the second terminal of winding 23, said waveform being illustrated in FIG. 3(C). A direct output winding 25 is wound on core 24, the dot notation in the drawing again indicating the winding terminals which are in phase. A first terminal of the aforesaid output winding is connected to a junction point 29, which in turn is connected to direct output terminal 11. A pulsed waveform $V_{1H}$, illustrated in FIG. 3(D), is applied to the second terminal of winding 25 by way of diode 27, the latter being poled to conduct when the potential on the connected winding terminal exceeds that of the applied pulses. Junction point 29 is resistor-coupled to the B+ source and diode-coupled to ground by means of diode 31, the latter connection preventing the potential of the point from rising above ground. Waveforms $V_{2L}$ and $V_{1H}$ are of the kind provided by the driver circuits described in the above-mentioned copending applications. As in the case of the waveforms illustrated in FIGS. 3(A) and 3(B), the amplitude of the pulses as well as the duration of the latter may be varied in accordance with the requirements of the apparatus.

It will be noted that the pair of waveforms illustrated in FIGS. 3(A) and 3(B), as well as in FIGS. 3(C) and 3(D) respectively, are synchronized such that positive $V_L$ pulses occur in time coincidence with negative $V_H$ pulses and vice versa. Additionally, the respective pairs of waveforms are synchronized with each other such that the duration of the long pulses of each pair of waveforms time-brackets the occurrence of the short pulses of the other pair. Thus, a negative $V_{2L}$ pulse which reads data into core 24 by rendering diode rectifier 26 conductive, occurs during the duration of a negative $V_{2H}$ pulse which reads data out of core 13 of the previous stage. Similarly, each negative $V_{1L}$ pulse which serves to read data into the odd stage (not shown) which follows the illustrated even stage, occurs during the duration of the negative $V_{1H}$ pulse which reads data out of core 24.

The notation employed herein which divides the circuit of FIG. 1 into odd and even amplifier stages, is arbitrary and is used only for convenience of reference. It should be noted, however, that any stage succeeding the illustrated even stage will be an odd stage of the kind shown, i. e. it will be pulsed by $V_{1L}$ and $V_{2H}$ pulses respectively. Similarly, only an even stage, i.e. one pulsed by $V_{2L}$ and $V_{1H}$ pulses respectively, could succeed the aforementioned odd stage. Thus, it will be apparent that a driving source which supplies the aforementioned two pairs of pulses is sufficient to drive an amplifier having any number of sequentially connected stages.

Figure 2:
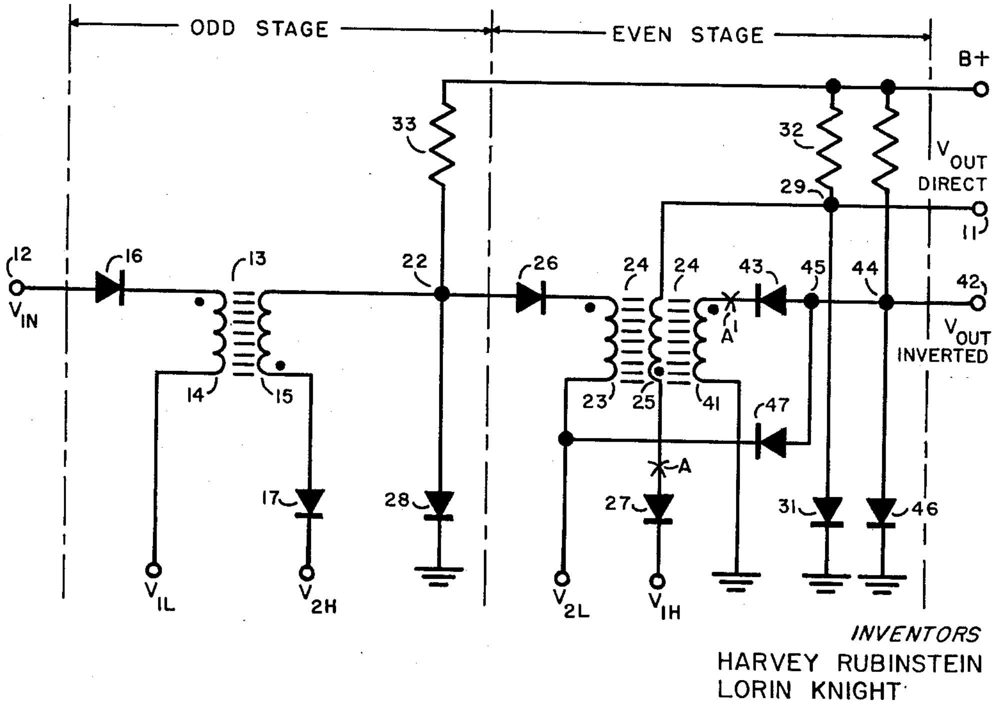
FIG. 2 illustrates the magnetic amplifier which is the subject matter of the present invention and which provides both direct and inverted output signals in response to an input signal.

The apparatus illustrated in FIG. 2 employs the circuitry shown in FIG. 1 and described above, and additionally provides means for obtaining an inverted output signal from the core of the even stage while preventing the spurious magnetization of said core. Wherever applicable, corresponding reference numerals have been carried over to FIG. 2. The inverted output signal is obtained from an inverted output winding 41 wound on core 24, the dot notation again indicating the terminals which are in phase. A first terminal of winding 41 is connected to the cathode of a diode rectifier 43, the anode of the latter being connected to inverted output terminal 42. The second terminal of winding 41 is connected to ground. Junction point 44 is resistor-coupled to the B+ source as well as being diode-coupled to ground by diode 46 to prevent its potential from rising above ground. A junction point 45 is diode-coupled to the source of $V_{2L}$ pulses, diode 47 being poled to conduct when the potential of junction point 45 is higher than that of the applied pulses.

It should be noted that an inverted output signal may be derived from an odd as well as even amplifier stage. In the latter case, an inverted output winding is necessary on core 13. The additional circuit elements would be connected like those shown in the even stage, the sole difference being that the equivalent of diode 47 is connected to the $V_{1L}$ source.

In operation, data is passed along successive stages of the amplifier illustrated in FIG. 1 by changing the sense of magnetization of the core in each stage according to the bit being passed. By convention, a negative input pulse denotes a binary Zero, while a no-pulse input signal indicates a binary One. An exemplary input signal is illustrated in FIG. 3(E) where two binary Zeros are succeeded by two binary Ones. The concurrent application of the negative $V_{in}$ pulse and the negative $V_{1L}$ pulse during time interval $t_1$ renders diode 16 non-conductive and prevents the negative $V_{1L}$ pulse from setting the core, i.e. placing it in one of the two predetermined states of magnetization. The application of the negative $V_{2H}$ pulse during the next portion of the cycle renders diode 17 conductive and applies a resetting pulse to the core. It should be noted that, regardless of the input signal, the latter action always occurs. Core 13 which is already in the "reset" state, i.e. in the other one of the aforesaid two states of magnetization due to the failure of the preceding negative $V_{1L}$ pulse to set it, remains in the reset state and winding 15 presents a negligible impedance to the pulse. Accordingly, junction point 22 is placed substantially at the potential of the negative $V_{2H}$ pulse and a negative input pulse is fed to the even stage of the amplifier. While the aforesaid negative input pulse, which forms the output signal of the odd stage, is applied to diode rectifier 26, the negative $V_{2L}$ pulse which is concurrently applied to winding 23 fails to render diode 26 conductive. The process then repeats essentially as described in connection with the operation of the odd stage, waveform $V_{1H}$ now providing the read-out pulses. As a result, an amplified negative output pulse which is representative of a binary Zero appears at direct output terminal 11, one cycle or bit period after the input signal occurs. It should be noted that the positive pulses applied by the respective driving pulse sources perform the function of rendering the respective diodes non-conductive during the time intervals in which the pulses are applied.

The output signal received at terminal 11 in response to the negative input pulse applied to terminal 12 during time interval $t_1$, is shown in FIG. 3(F) and is seen to bracket time interval $t_2$. A similar output signal appears at terminal 11 during an interval which time-brackets interval $t_3$, in response to the negative input pulse representative of another binary Zero which is applied during an interval which time-brackets interval $t_2$.

If a binary One is applied at the input, as shown in FIG. 3(E) during a time interval which includes interval $t_3$, the application of a negative $V_{1L}$ pulse renders diode 16 conductive for the duration of interval $t_3$. The resulting pulse which is applied via winding 14 then sets core 13. The subsequently applied negative $V_{2H}$ pulse resets the core, causing winding 15 to present a relatively large impedance. The division of voltage so produced between resistor 33 and the impedance of winding 15 acts to raise the potential of junction point 22, while clamping diode 28 prevents it from rising above ground. Thus, a binary One is read out of core 13 and into core 24 where the subsequently occurring negative $V_{2L}$ pulse again renders diode 26 conductive and repeats the procedure. The output signal obtained at direct output terminal 11 is illustrated in FIG. 3(F), the output voltage being at ground during time interval $t_4$, indicative of a binary One. Similarly, the output signal is at ground during time interval $t_5$ in response to the binary One applied to input terminal 12 one bit period earlier.

It will be noted from FIG. 3, that the $V_H$ pulses applied in each stage of the amplifier of FIG. 1 are directly responsible for the signal obtained at the output of that stage. Thus, under ideal conditions, the negative $V_{1H}$ pulse occurring during time interval $t_7$ would produce an output pulse at terminal 11 having a duration equal to that of said negative $V_{1H}$ pulse. The time interval $t_8$ which elapses between the commencement of the negative $V_{1H}$ pulse and the point in time when a corresponding signal appears at the output terminal, is due to a number of factors which include the switching time of diode 27 as well as the delay due to the inductance of the output winding. It will be seen, however, that despite this delay interval the proper negative output voltage appears on terminal 11 during time interval $t_2$. The delay interval is evidently critical and conditions imposing additional delay are prone to produce an erroneous reading during interval $t_2$. No such delay interval is evident when binary Ones are being read out, the direct output terminal being at ground potential during the application of the preceding positive $V_{1H}$ pulse. The negative output pulse occurring during interval $t_{11}$ which terminates the One output signal, commences when the resetting of core 24 is complete and winding 25 no longer presents a high impedance. At such time junction point 29, and hence output terminal 11, assumes substantially the potential of the negative $V_{1H}$ pulse until the latter is terminated. Binary Ones of the input signal illustrated in FIG. 3(E) have purposely been drawn to include the aforementioned negative pulse portion so as to illustrate the general case, i.e. the condition where the odd stage illustrated is not the first stage of a multi-stage magnetic amplifier and receives its input signal from a preceding even stage. Where the latter is not the case, the negative pulse portion need not be included in order to represent a binary One.

FIG. 3(H) illustrates the potential at point A in the circuit of FIG. 1. It is seen that the application of a positive $V_{1H}$ pulse during interval $t_{12}$ does not immediately cause point A to return to ground since diode 27 does not become non-conductive at once. This is due to the fact that the inductance of winding 25 accommodates an abrupt voltage change, but does not permit the current flowing therein to change abruptly. Accordingly, the potential of point A adjusts itself to maintain the current at the value it was just prior to the time waveform $V_{1H}$ went positive. Accordingly, a voltage of substantially +18 v. is applied to point A before diode 27 cuts off. The inductance of winding 25, together with the stray capacitance seen by the winding, forms a resonant circuit which gives rise to oscillations upon the occurrence of the aforesaid voltage change. This is shown in FIG. 3(H). The first half cycle of this oscillatory voltage is sufficiently large to partially set the core, while the succeeding half cycle, being of opposite polarity and reduced amplitude, partially resets the core. Succeeding half cycles of voltage will similarly partially set and reset the core with the result that, at the commencement of time interval $t_7$, the core will be partially set, i.e. partially magnetized in the One sense. The degree of magnetization is dependent on the polarity of the oscillatory voltage at the beginning of $t_{12}$. The "set" so acquired by core 24 must be overcome when the negative $V_{1H}$ pulse again resets the core. The delay thus introduced contributes to the aforementioned interval $t_8$, shown in FIG. 3(F), to an extent which, however, can still be tolerated.

FIG. 3(G) shows a logically inverted output signal which is derived from the inverted output terminal 42 of FIG. 2 under ideal conditions, with diode 47 disconnected. By ideal conditions is meant the case where, among other things, the application of the negative $V_{1H}$ pulse causes point A to revert to ground potential without oscillations. It will be seen from FIG. 3(G) that a negative pulse appears at the inverted output terminal during time interval $t_8$. Binary Zeros appearing at the inverted output are seen to commence with the initiation of the corresponding $V_1H$ pulse. This is indicated by the appearance of a negative voltage at terminal 42 at the initiation of time interval $t_{10}$. The negative pulse so applied is terminated as soon as the resetting of core 24 is complete, at the time when interval $t_{11}$ commences.

The voltage relationships which obtain at point A under non-ideal conditions, with diode 47 disconnected, are illustrated in FIG. 3(I). The voltages on points A and A', which are respectively connected to windings 25 and 41, are in phase as indicated by the dot notation in FIG. 2. The negative excursions of the voltage oscillations which formerly occurred in the resonant circuit composed of the inductance of winding 25 and the stray capacity seen by the same winding, are now damped out due to the fact that diode 43 conducts whenever point A', and hence point A, goes negative. These points are thus connected to ground through diode 46 which is conductive during the same time interval. As a result, only one positive voltage swing occurs and the potential on point A reverts to ground thereafter. It should be noted that the attempted oscillations are of a lower frequency than in the case discussed in connection with FIG. 3(H), because of the additional stray capacitance of the winding 41 which is now seen by winding 25. The result of the unbalanced voltage excursion is to apply sufficient "set" to core 24 to extend the aforesaid delay interval of the output signal beyond the tolerable limit. As a result, the direct output signal now indicates ground potential during a portion of time interval $t_2$ and a negative voltage during the rest of the time interval. Accordingly, a faulty binary Zero signal appears at the output, such binary Zero being indicated as 0 in FIG. 3(J). Thus, any subsequent amplifier stage will receive the faulty binary Zero as an input signal during interval $t_2$ when the negative $V_{1L}$ read-in pulse is applied. Under these circumstances it is impossible for the aforesaid signal to carry out its intended function and hence, an incorrect reading will be obtained. The series connection of successive amplifier stages dictates that the erroneous data be passed on to the ultimate output. It will be noted that binary Ones at the direct output terminal do not suffer in the process, while binary Ones at the inverted output terminal, as shown in FIG. 3(K), also yield an erroneous output signal prior to correction.

This difficulty, which under certain conditions can render the apparatus useless, is effectively alleviated by connecting diode 47 between junction point 45 and the source of the $V_{2L}$ pulses, as shown in FIG. 2. Under these conditions, a negative $V_{2L}$ pulse, having an amplitude of −6 v. in a preferred embodiment, is applied to diode 47 during the interval of each positive $V_{1H}$ pulse, at the time when the potential on point A has a tendency to oscillate. Whereas any tendency on the part of point A' to become negative was formerly prevented by the resultant conductivity of diode 43, diode 47 in the present arrangement becomes conductive upon the application of the negative $V_{2L}$ pulse and applies the potential of the latter to point 45. Thus, point A' and, by transformer action, point A are permitted to go to −6 v. before diode 43 conducts to cut off a greater voltage excursion. This relationship is shown in FIG. 3(L). As a result, some negative oscillations occur and the resultant set on core 24 remains small. As shown in FIG. 3(M) the resultant delay is again within tolerable limits, the proper output voltage appearing on the direct output terminal during the entire interval $t_2$. Similarly, as seen from FIG. 3(N), the proper signal also appears at the inverted output terminal. It will be noted, however, that during the non-critical time intervals, e.g. the interval between $t_2$ and $t_3$, the voltage does not revert to ground but merely goes to −6 v. Since no reading of the output signal occurs during these intervals, this effect is of no consequence upon the operation of the circuit. Accordingly, by the use of only one additional component and without requiring an additional pulse source, the reliability of the amplifier has been improved while maintaining its operating frequency and without placing undue limitations on the components employed.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. In a magnetic amplifier for providing both direct and inverted output signals at corresponding output terminals in response to an input signal, a saturable magnetic core having a substantially rectangular hysteresis characteristic enabling it to exist in one of two magnetic states, an input winding wound on said core, a direct output winding arranged in opposite sense to said input winding, an inverted output winding arranged in the same sense as said input winding, each of said windings having first and second terminals, means for applying a first series of alternately positive and negative pulses to the second terminal of said input winding, means for applying a second series of alternately positive and negative pulses to the second terminal of said direct output winding, oppositely poled pulses of respective pulse series occurring in time coincidence, first unidirectional means connected to the first terminal of said input winding for transmitting an input signal thereto and poled to conduct when the potential of said input signal exceeds that of the connected winding terminal, second unidirectional means connected to the second terminal of said direct output winding and poled to conduct when the potential of the latter terminal exceeds that of the applied pulses of said second series, the second terminal of said inverted output winding being connected to a reference point, each of said output terminals being resistor-coupled to a source of positive D.C. voltage, each of said output terminals additionally being coupled to a point of reference to prevent the potential thereon from rising above that of the reference, the first terminal of said direct output winding being connected to said direct output terminal, third unidirectional means connected intermediate the first terminal of said inverted output winding and said inverted output terminal and poled to conduct when the potential of the latter terminal exceeds that of the connected winding terminal, and means permitting said last recited terminal to assume a potential below that of the aforesaid point of reference.

2. The apparatus of claim 1 wherein said last recited means comprises fourth unidirectional means connected intermediate said inverted output terminal and the second terminal of said input winding, said fourth unidirectional means being poled to conduct when the potential of the latter terminal is less than that of said inverted output terminal.

3. In a magnetic amplifier for providing both direct and inverted output signals at corresponding output terminals in response to an input signal, a saturable magnetic core having a substantially rectangular hysteresis characteristic enabling it to exist in one of two magnetic states, an input winding wound on said core, a direct output winding arranged in opposite sense to said input winding, an inverted output winding arranged in the same sense as said input winding, each of said windings having first and second terminals, means for applying a first series of alternately positive and negative pulses to the second terminal of said input winding, means for applying a second series of alternately positive and negative pulses to the second terminal of said direct output winding, oppositely poled pulses of respective pulse series occurring in time coincidence, first unidirectional means connected to the first terminal of said input winding for transmitting an input signal thereto and poled to conduct when the potential of said input signal exceeds that of the connected winding terminal, second unidirectional means connected to the second terminal of said direct output winding and poled to conduct when the potential of the latter terminal exceeds that of the applied pulses of said second series, the second terminal of said inverted output winding being connected to a reference point, each of said output terminals being resistor-coupled to a source of positive D.C. voltage, each of said output terminals additionally being coupled to a point of reference to prevent the potential thereon from rising above that of the reference, the first terminal of said direct output winding being connected to said direct output terminal, third unidirectional means connected intermediate the first terminal of said inverted output winding and said inverted output terminal and poled to conduct when the potential of the latter terminal exceeds that of the connected winding terminal, and fourth unidirectional means coupling said inverted output terminal with the second terminal of said input winding to prevent the spurious magnetization of said core, said fourth unidirectional means being poled to conduct when the potential of said last recited terminal is less than that of said inverted output terminal.

4. A magnetic amplifier comprising a sequence of alternately odd and even stages connected in tandem, each of said stages including a saturable magnetic core having a rectangular hysteresis characteristic and capable of existing in one of two magnetic states, means for applying respective odd and even pairs of pulse series to the cores of corresponding stages of said magnetic amplifier, each pair comprising first and second pulse series of alternately positive and negative pulses, oppositely poled pulses of the respective pulse series in each pair occurring in time coincidence, said odd and even pairs of pulse series being synchronized such that the negative pulses of the first series of each pair are time-bracketed by the negative pulses of the second series of the other pair, means for applying an input signal to the first stage of said amplifier, an output stage, output terminals for deriving direct and inverted output signals respectively in response to said input signal, first and second linking means for coupling the core of said output stage to said direct and inverted output terminals respectively, and means for pulsing said second linking means with pulses of the first series applied to the core of said output stage to prevent spurious changes in the magnetization of said last recited core.

5. The apparatus of claim 4 and further comprising first and second windings arranged in opposite sense on each of said cores, the core of said output stage additionally carrying a third winding arranged in the same sense as said first winding, means for applying said input signal to the first core winding of said first stage, means for applying respective first and second pulse series of said odd and even pairs to the corresponding core windings of the appropriate amplifier stages, unilaterally conductive means connected to each of said first and second core windings and poled to conduct upon the application of negative pulses of the corresponding pulse series, said second linking means comprising unilaterally conductive means connected intermediate said third core winding and said inverted output terminal and poled to conduct when the potential of the latter terminal exceeds that of the connected winding terminal, said means for pulsing said second linking means comprising unilaterally conductive means connected to said inverted output terminal and poled to conduct when the potential of the latter terminal exceeds that of the applied pulses.

6. The apparatus of claim 5 and further comprising means for coupling said third winding to a point of reference potential, the second winding of each amplifier stage comprising an output terminal connected to the first winding of the subsequent stage, the output terminals of each stage, including said output stage, being resistor-coupled to a source of positive D.C. voltage, each of said output terminals being further coupled to a point of reference potential to prevent its potential from exceeding that of the reference.

7. A magnetic amplifier comprising at least first and second saturable magnetic cores, each of said cores carrying first and second windings arranged in opposite sense thereon, said second core additionally carrying a third winding arranged in the same sense as said first winding, means for applying an input signal to the first winding on said first core, means for applying a first pair of pulse series to respective first and second windings of said first core, means for applying a second pair of pulse series to respective first and second windings of said second core, each of said pairs comprising two series of alternately positive and negative pulses, oppositely poled pulses of each pair of pulse series occurring coincidentally, the negative pulses applied to the second winding of said first core time-bracketing the negative pulses applied to the first winding of said second core, unidirectional means connected to respective first and second windings of each of said cores and poled to prevent current flow in said windings upon the application of positive pulses of said pulse series, one terminal of the second winding of each of said cores constituting a direct output terminal, said third coil having one terminal connected to ground, an inverted output terminal, third unidirectional means connected intermediate the latter terminal and the other terminal of said third winding and poled to conduct when the potential of said inverted output terminal exceeds that of the connected winding terminal, fourth unidirectional means connected intermediate said means for pulsing the first winding of said second core and said inverted output terminal and poled to conduct when the potential of the latter terminal exceeds the potential of the applied pulses, the direct output terminal of the second winding of said first core linking the latter winding with the first winding of said second core, each of said output terminals being connected to a source of positive voltage, said output terminals being further coupled to a reference potential to prevent their potential from rising above that of the reference.

8. A magnetic amplifier for simultaneously providing both direct and inverted output signals at separate output terminals in response to an input signal comprising:

a bistable magnetic core having an input winding and first and second output windings, the first output winding being arranged to provide a signal in phase with the signal applied to the input winding, the second output winding being arranged to provide a signal in anti-phase with the signal applied to the input winding;

means for applying a train of alternately positive and negative pulses to the input winding;

means for applying a train of alternately negative and positive pulses to the second output winding;

and means coupling one end of the first output winding to the out of phase end of the input winding, the coupling means comprising a diode arranged to conduct when the potential at the one end of the first output winding exceeds the potential at the out of phase end of the input winding.

References Cited in the file of this patent

UNITED STATES PATENTS

| | | |
|---|---|---|
| 2,733,424 | Chen | Jan. 31, 1956 |
| 2,813,207 | Bonn | Nov. 12, 1957 |
| 2,830,196 | Eckert | Apr. 8, 1958 |
| 2,949,230 | Eckert | Aug. 16, 1960 |
| 2,972,060 | Torrey | Feb. 14, 1961 |